United States Patent [19]

Fraden

[11] Patent Number: 5,127,742
[45] Date of Patent: Jul. 7, 1992

[54] APPARATUS AND METHOD FOR TEMPERATURE MEASUREMENT BY RADIATION

[75] Inventor: Jacob Fraden, La Jolla, Calif.

[73] Assignee: Thermoscan Inc., San Diego, Calif.

[21] Appl. No.: 688,014

[22] Filed: Apr. 19, 1991

[51] Int. Cl.⁵ .......................... G01J 5/08; G01J 5/52; G01J 5/62
[52] U.S. Cl. ................................... 374/129; 374/126; 374/130
[58] Field of Search ............... 374/129, 126, 123, 130, 374/128; 356/43

[56] References Cited

U.S. PATENT DOCUMENTS

| | | | |
|---|---|---|---|
| 3,091,693 | 5/1963 | Rudomanski et al. | 374/129 |
| 3,350,562 | 10/1967 | Flint | 374/126 |
| 3,354,773 | 11/1967 | Shreve | 374/130 |
| 3,492,869 | 2/1970 | Toyota et al. | 374/126 |
| 3,539,807 | 11/1970 | Bickel | 374/129 |
| 3,611,806 | 10/1971 | Hishikari | 374/129 |
| 3,916,690 | 11/1975 | Brandli | 374/129 |
| 4,005,605 | 1/1977 | Michael | 374/129 |
| 4,427,306 | 1/1984 | Adamson | 374/128 |
| 4,433,924 | 2/1984 | Quinn, III | 374/129 |
| 4,602,642 | 7/1986 | O'Hara et al. | 128/664 |
| 4,634,294 | 1/1987 | Christol et al. | 374/170 |
| 4,790,324 | 12/1988 | O'Hara et al. | 128/664 |
| 4,797,840 | 1/1989 | Fraden | 364/557 |
| 4,854,730 | 8/1989 | Fraden | 374/164 |
| 4,907,895 | 3/1990 | Everest | 374/130 |

FOREIGN PATENT DOCUMENTS

| | | | |
|---|---|---|---|
| 0098402 | 1/1984 | European Pat. Off. | 374/129 |
| 0154426 | 12/1980 | Japan | 374/129 |
| 0187829 | 9/1985 | Japan | 374/126 |
| 0147818 | 1/1962 | U.S.S.R. | 374/129 |

OTHER PUBLICATIONS

Roskoshnyi, V., "A Device For Measuring the Temperature of High Temperature Gas-Discharge Heating Sources", Instruments and Exp. Techniques (USSR), vol. 16, No. 6 (Nov.-Dec. 1973).

"Computer Speeds Up Pyrometer Response", Instrumentation Technology, vol. 17, No. 11 (Nov. 1970).

Primary Examiner—William A. Cuchlinski, Jr.
Assistant Examiner—Diego F. F. Gutierrez
Attorney, Agent, or Firm—Robert A. Seemann

[57] ABSTRACT

A thermal radiation sensor is joined with a shutter that is adapted for reversible interruption of radiation from an object to the sensor. The shutter includes an integral electrically operated heater for maintaining a portion of the shutter at a predetermined temperature as a thermal reference for the sensor. The sensor is alternatively exposed to radiation from the object and the thermal reference portion of the shutter, and provides a first signal representative of the radiation that it receives from the object and a second signal representative of the radiation that it receives from the reference portion. An electronic circuit is connected to the sensor for receiving the first and second signals, for calculating the temperature of the object, and for providing a signal representative of the calculated temperature.

12 Claims, 2 Drawing Sheets

APPARATUS AND METHOD FOR TEMPERATURE MEASUREMENT BY RADIATION

BACKGROUND OF THE INVENTION

1. Field of the Invention

The present invention relates to infrared thermometers, more specifically to a thermometer which uses a shutter or chopper for a thermal reference.

2. Description of the Prior Art

A wide choice of sensors are available for measurement of the temperature of an object by infrared radiation. The range of choice includes but is not limited to thermopiles, pyroelectrics, bolometers, and active infrared sensors.

An infrared sensor generates a signal which is representative of two temperatures: its own surface temperature and that of the object target. A relationship between those temperatures and a sensor's reaction is governed by Stefan-Boltzmann law:

$$V = k\epsilon_b\epsilon_s(T_b^4 - T_s^4) \qquad (1)$$

where V is the sensor's output signal, $T_s$ its surface temperature $\epsilon_b$ and $\epsilon_s$ are emissivities of the target and sensor respectively, k is a constant, and $T_b$ is the temperature of the object.

It is seen from the above equation that to calculate $T_b$, one must first determine two values: V and $T_s$. This is not a simple task because an infrared sensor with a good speed response is generally fabricated in the form of a thin flake or membrane, of which the surface temperature is difficult to measure and changes upon exposure to a target. Inaccurate determination of a sensor's surface temperature results in error in a non-contact temperature sensor. Several methods for reducing the error are known to the art.

One way to minimize the error is to first measure thermal radiation from a known temperature source and then from the object.

The sensor is alternatively exposed to the calibrated temperature and then to the unknown temperature. This may be accomplished by use of a chopper as described in U.S. Pat. No. 4,907,895 issued to Everest or by use of a shutter as in U.S. Pat. No. 4,797,840 issued to Fraden.

U.S. Pat. No. 4,634,294 issued to Christol et al. teaches use of a folded mirror, while U.S. Pat. No. 4,005,605 issued to Michael describes a moving focusing mirror to aim the infrared sensor alternatively toward the reference target and toward the object target.

The temperature of the mechanical chopper or shutter is determined by reference to a separate temperature sensor which measures ambient temperature.

Given the value of the ambient temperature, the temperature of the object target may be calculated from the equation:

$$V = \epsilon_b\epsilon_s(T_b^4 - T_a^4) \qquad (2)$$

where $T_a$ is the ambient temperature. It is seen now that $T_s$ is not a part of the calculation. This implies that $T_s$ can be an unimportant factor in accurate measurement of temperature. This possibility can be closely approached if a shutter, chopper or mirror alternates infrared flux at the infrared sensor surface relatively quickly to prevent drift in the infrared sensor's surface temperature.

Adjusting equation 2 for calculating the temperature of an object target, we obtain equation 3, where n is a constant that is determined during the calibrating process by measuring the temperature of a calibrated heat source of a known temperature:

$$T_b = \sqrt[4]{T_a^4 + nV} \qquad (3)$$

Another way to reduce the error associated with un-known $T_s$ is described in U.S. Pat. No. 4,854,730, issued to Fraden where the sensor's surface temperature is actively controlled to stay constant at a predetermined level. The method is carried out without moving components, but requires that the selected $T_s$ be generally higher than the highest expected temperature of the object target. This can be a limiting factor in some applications.

U.S. Pat. Nos. 4,790,324 and 4,602,642 issued to O'Hara et al. teach another method of solving the problem in which no mechanical chopper or shutter is required during measurement of the object. A separate calibrated reference target, however, is employed. The temperature of that calibrated target is controlled and accurately measured.

Before measurement of the object temperature, the infrared sensor probe of the thermometer is manually positioned to view the calibrated target to detect its infrared flux and calibrate the infrared sensor. To further improve accuracy, the infrared sensor body is heated to bring its temperature closer to that of the reference target. This reduces sensor errors, such as drift, non-linearity, noise, etc.

Disadvantages of this method include complex design, high power consumption and need of the manual calibration before each temperature measurement.

A pyroelectric infrared thermometer which is described by U.S. Pat. No. 4,797,840 issued to Fraden includes a shutter for causing a transient response in the infrared sensor. The pyroelectric type sensor is an a.c. device which responds to change in temperature, rather than to its temperature state. One example is an ultra thin foil of pyroelectric material such as polyvinylidene fluoride (PVDF). If electrically polarized, such a film exhibits a pyroelectric effect in that it is able to generate an electrical charge in response to a change in its temperature produced by the receipt of infrared radiation.

In Fraden '840, the shutter in the pyroelectric thermometer serves two functions. One is to control infrared radiation flow to the infrared sensor to generate a transient response. The other is to serve as a thermal reference source at ambient temperature that provides intimate thermal coupling with the sensor within a period that the sensor is not exposed to the object. The sensor is exposed to the surface of the blade prior to measurement of the object, and ambient temperature is measured by a second sensor to obtain the reference temperature for use in calculations.

One major disadvantage of prior art moving-part thermometers is a relatively broad range of a shutter or chopper temperatures resulting from their following ambient conditions. In order to overcome this deficiency, it is necessary to use more costly infrared sensors of higher stability and low noise, and electronic processing circuits of broad dynamic range. The instrument therefore becomes more complex in design and expensive to manufacture.

SUMMARY OF THE INVENTION

It is one objective of the present invention to provide a thermometer which measures by radiation, that is independent of ambient temperature.

It is another objective to provide a radiation thermometer in which the reference circuit operates over a narrow dynamic range of infrared flux measurement.

It is another object of this invention to provide an infrared thermometer with a chopper or shutter, the surface temperature of which is controlled at a predetermined level.

An infrared thermometer according to the present invention incorporates an infrared sensor, an electronic circuit and a shutter (leaf, plate, chopper, etc.). The temperature of a portion of the surface of the shutter is electronically controlled at a predetermined level.

The meaning of the term "portion" is meant to include any desired portion of the area, from less than 100%, up to and including 100% of the surface of the shutter.

The infrared sensor is alternatively exposed to the shutter's temperature controlled surface, and to a target of interest (the object). Virtually any infrared sensor known in the art may be employed.

An ambient sensor is no longer required, however it still may be used to correct for some errors which may arise from variations in ambient temperature.

The above mentioned equation 3 may be used to calculate target temperature assuming that $T_a$ is a surface temperature of the shutter blade. While the shutter temperature may be controlled at any appropriate level, it is generally more convenient to maintain it above the highest expected ambient temperature, thus eliminating a need for cooling devices.

In accordance with the invention, a thermal radiation sensor is mounted on a support means of the type known in the art of apparatus manufacture, for receiving radiation from an object.

A shutter is mounted on the support means for reversible interruption of the radiation between the object and the sensor.

Means for changing the temperature of a portion of the shutter, and means for measuring the temperature of the portion of the shutter and for providing a first signal representative of the temperature of the portion of the shutter, are attached to the shutter.

A control circuit is connected to the means for measuring the temperature of the portion, for receiving the first signal and for operating the means for changing the temperature of the portion of the shutter, for maintaining the portion at a predetermined temperature for providing thermal reference for the sensor.

It should be obvious to realize that "a portion" may encompass up to 100% of the surface of the shutter.

Means are provided for alternatively exposing the sensor to radiation from the object, and to radiation from the thermal reference portion of the shutter.

The thermal radiation sensor which receives radiation from the object provides a signal that is representative of the radiation that it receives.

One or more electronic circuits are connected to the sensor for receiving the signal, for calculating the temperature and for providing a signal representative of the calculated temperature.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Before explaining the invention in detail, it is to be understood that the phraseology or terminology used herein is for the purpose of description and not of limitation, and that the invention is not limited in its application to only the detail of construction and arrangement of parts illustrated, since the invention is capable of other embodiments and of being practiced or carried out in other ways.

For the sake of clarity and brevity, components which would be obviously employed in constructing a working unit that are known to the construction art, are not included or detailed herein. Such parts are, for example, a housing, focusing components, power supplies, etc.

Figure 1:
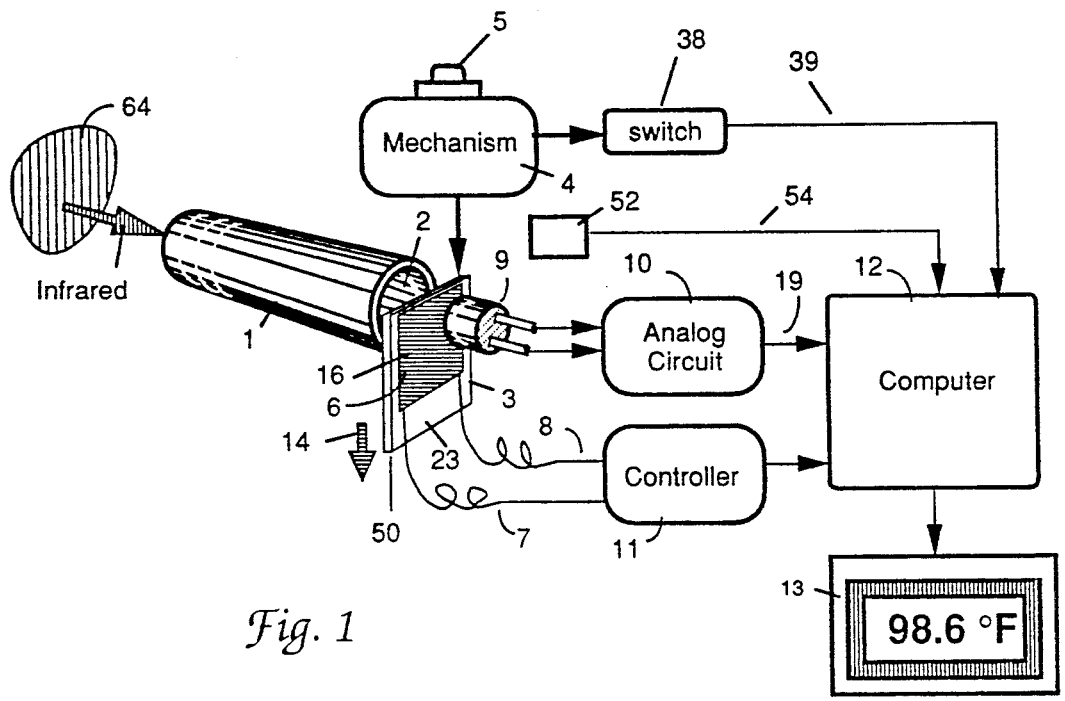
FIG. 1 is a schematic view of a preferred embodiment of the present invention.

Referring to FIG. 1, infrared radiation from an object target 64 is optically received by infrared thermometer 50 by way of wave guide 1. Instead of the tubular guide, any radiation directing or guiding element known to the art such as a mirror, parabolic or spherical reflector, Fresnel lens, etc may be used.

Wave guide 1 channels radiation into the thermometer by means of multiple internal reflections from an inner surface 2 that is highly reflective in the wave length range of interest. Inner surface 2 may be coated with gold or aluminum.

The proximal end of wave guide 1 is occluded by shutter 3 which is moved by mechanism 4. Mechanism 4 may be mechanical or electromechanical in nature. Any conventional mechanism design that is known to the art may be used.

Infrared sensor 9 is positioned in coaxial disposition with wave guide 1 for receiving infrared radiation by way of the wave guide. The sensor may be any type known to the art. The purpose of the sensor is to generate an electrical signal which is representative of the received radiation. Operation with two different types of sensor 9 are discussed below in greater detail.

Thermal surface 6, of side 23, of shutter 3 faces infrared sensor 9. Temeprature $T_a$ of surface 6 is controlled by electric power supplied via lines 7 and 8 to heater/cooler 16 which forms an integral part of thermal surface 6.

Thermal surface 6 has high emissivity in the wave length of interest. The high emissivity can be provided by an appropriate coating of high emissivity.

Analog circuit 10 receives the output signal voltage from sensor 9, and conditions the signal for further processing by computer 12 which provides a signal suitable for operating display 13.

The temperature of thermal surface 6 depends on the operation of heater/cooler 16. Heater/cooler 16 is under control of controller 11 which sets and regulates shutter surface temperature $T_a$. $T_a$ should preferably be constant and higher than any expected operating ambient temperature. For example, in a medical thermometer, $T_a$ may be selected to be 40 degrees C., or 104 degrees F. which is higher than the typical operating room temperature. Heater/cooler 16 only has to provide heat, and can conveniently be a simple resistive heater.

Another way to control the temperature of thermal surface 6 is by making heater/cooler 16 from a self temperature regulating element, such as a PTC thermistor. A PTC thermistor, is capable of self-regulating its own temperature when supplied by electric power, without the need for an external controller. A PTC thermistor generally comprises material having a positive temperature coefficient of resistance.

If, in a thermometer application, the preferable range of $T_a$ is at or below ambient, a thermoelectric cooler operating on the Peltier effect may be used in heater/cooler 16.

Controller 11 may be of the electrical feedback type or other conventional design, and is not covered here.

Mechanism 4 may be activated either by command from computer 12 or manually by push-button 5. In the latter case, mechanism 4 activates switch 38 which sends a signal via line 39 to computer 12 to indicate the shutter operation.

When computer 12 receives the shutter operation signal from switch 38, and receives analog circuit 10 and controller 11 signals, it calculates the object target's temperature by a conventional algorithm such as equation 3. The computer then controls display 13 to indicate the calculated temperature.

The dynamic operation of a thermometer according to the invention will now be described with reference to FIG. 2.

At the start, shutter 3 is closed and the power supply (not shown) is turned off. Shutter 3 completely blocks passage of infrared radiation from the object target 64 to the infrared sensor.

Upon power-on, at moment 29, controller 11 provides power to heater/cooler 16 to raise the temperature of thermal surface 6. The temperature changes and after possibly some overshoot, stabilizes at a steady level $T_a$, the value of which is defined by a conventional reference circuit within controller 11, or by computer 12. For some applications, the selection of $T_a$ may be controlled by the computer so that $T_a$ can be changed at any time according to a program.

Preferably, sensor 9 and shutter 3 are arranged so that the sensor views exclusively either the heater/cooler portion of the shutter, or the object 64. When this is not possible, the sensor may also be exposed to other internal components which are generally at ambient temperature. In that situation, an additional sensor 52 monitors ambient temperature and provides a signal via line 54 to computer 12 for better compensation over ambient temperature variations.

Two of the types of sensor 9 which may be employed in the present invention will now be described with respect to the invention. One type is a thermal detector or d.c. sensor. Examples of such sensors are thermopiles, bolometers, and active infrared sensors.

The other type is a heat flow or a.c. sensor. One example is a pyroelectric sensor which was described earlier.

Figure 2:
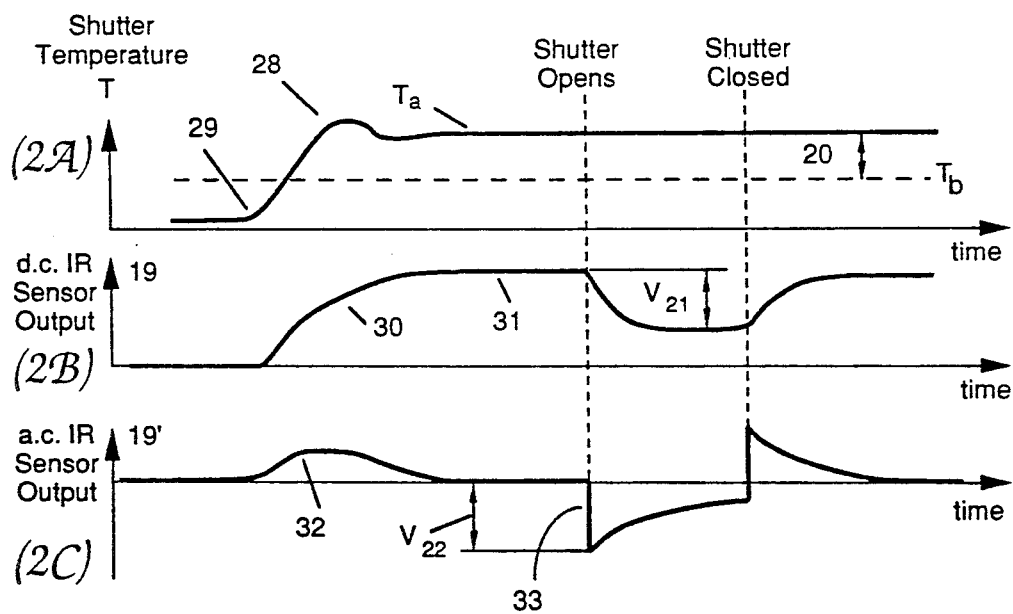
FIG. 2 is a timing diagram of temperatures and sections 2A, 2B, and 2C, constructed according to the invention.

FIG. 2 compares output voltage 19 of sensor 9 (FIG. 2 sections 2B and 2C) with shutter activity (FIG. 2, section 2A), taken, for example, after treatment by an analog circuit 10. Although for purpose of exposition a d.c. sensor signal 19, and an a.c. detector signal 19' are shown, it should be clear that only one such sensor is required in a particular thermometer.

The d.c. sensor signal (FIG. 2, section 2B) will be discussed first. Upon power on, shutter heater/cooler surface 16 is energized with the objective of bringing it to predetermined temperature $T_a$.

Output signal 19 after conditioning by analog circuit 10 will change in accordance with the change in temperature $T_a$ of thermal surface 6. This is illustrated by transient 30 in the voltage. After the shutter surface temperature stabilizes at the predetermined $T_a$, infrared sensor 9 voltage 19 settles to a steady state level 31.

At that time, the infrared thermometer 50 is ready to measure the temperature of the object. Waveguide 1 should be aimed at the object target 64, the temperature $T_b$ of the object target may be higher or lower than $T_a$. The sensor output levels in FIG. 2 are for an object having a temperature which is lower than that of shutter 3, the temperature difference being represented by vertical difference 20.

Mechanism 4 is activated when push-button 5 is depressed. Shutter 3 moves in direction 14, out from the field of view of sensor 9 for the thermal radiation from wave guide 1. d.c. infrared sensor 9 responds with a reduced output signal which is shown as voltage change V21. Computer 12 uses that change, along with value $T_a$, to calculate, by use of equation 3 for example, an object target temperature.

When shutter 3 is closed, output voltage 19 from infrared sensor 9 returns to its steady-state level 31. Mechanism 4 must keep the shutter open long enough for voltage change V21 to develop fully.

Now turning to the other type of sensor 9 discussed here, a.c. infrared sensor and output voltage 19' shown in FIG. 2 section 2B. Upon power-on, sensor 9 generates transition spike 32 before $T_a$ stabilizes. Spike 32 is not used in calculation of the object temperature.

When shutter 3 opens, sensor 9 generates transient signal 33, the amplitude V22 of which is dependent upon temperature gradient 20. Spike V22 is utilized by computer 12 in calculating the temperature of the object target. Also, when the shutter opens, switch 38 sends a signal to computer 12 which initializes the measurement cycle.

When the measurement cycle and all calculations are completed, computer 12 commands display 13 to indicate the calculated temperature.

Figure 3:
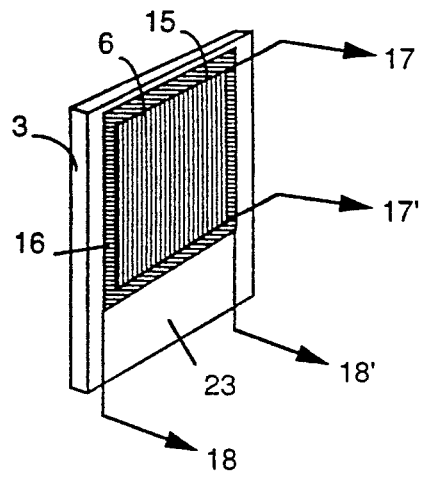
FIG. 3 is a shutter blade according to the invention, with laminated heater and temperature sensor.

FIG. 3 shows one way to construct shutter 3. Heater/cooler layer 16, which may be a distributed resistor or thermoelectric element, is laminated to or deposited upon front surface 23 which would face sensor 9.

Temperature sensitive layer 15 is a resistive film with a high temperature coefficient of resistance, that is, a thermistor.

There may be some other layers such as an electrical insulation layer, which are not shown.

The heater/cooler is connected to a controller through lines 18 and 18'. Sensor 15 is connected to a controller through lines 17 and 17'. The controller, as in 11 of FIG. 1, measures thermal surface 6 temperature $T_a$ through sensor 15, and provides power to the heater/cooler to maintain the $T_a$ at the desired temperature level.

The layers preferably are in intimate thermal contact with one another. To minimize energy loss, shutter 3 is preferably made from a material of low thermal conductivity.

In another embodiment, the discrete heater/cooler layer is omitted, and sensor 15 is a thermistor operating in a self-heating mode, so that elements 15 and 16 are present in one element.

Figure 4:
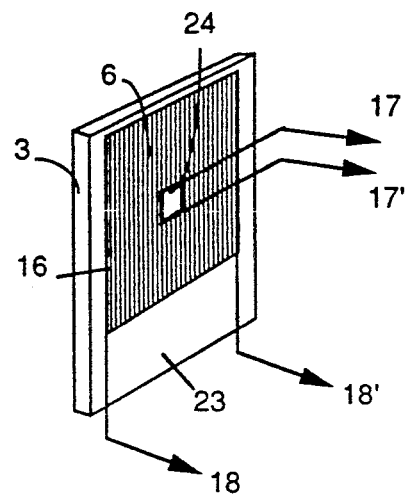
FIG. 4 is another shutter according to the invention, with a heating layer and a discrete temperature sensor.

Another way to make shutter 3 with a controlled surface temperature portion is shown in FIG. 4. Here, discrete temperature sensor 24 is located centrally on heater/cooler 16.

Figure 5:
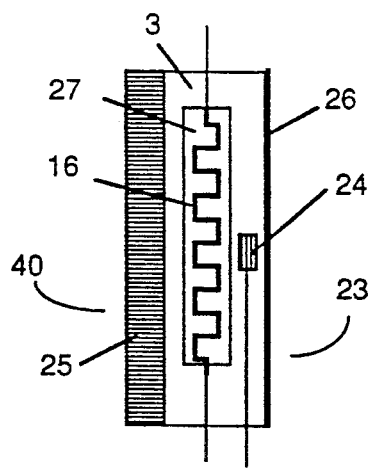
FIG. 5 is another shutter according to the invention, with imbedded components.

In FIG. 5, heater/cooler 16 is located within body cavity 27 of shutter 3. Shutter body 3 is made from a material having a high thermal conductivity such as copper. Sensor 24 monitors the temperature of the shutter.

Side 23 of shutter 3 which faces sensor 9 should have a relatively high emissivity. This can be accomplished by coating that side with a highly emissive layer 26. Layer 26 may be an organic coating, lampblack, gold-black and other material having the desired emissivity.

To reduce loss of unused heat, side 40 is given thermal insulator 25.

Figure 6:
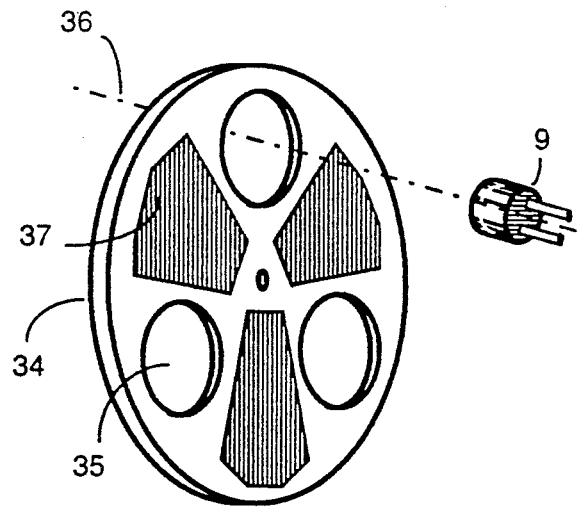
FIG. 6 is a perspective view of a chopper disk with thermally controlled sectors, and an aimed sensor.

Referring to FIG. 6, the shutter takes the form of a chopper wheel 34 which is generally opaque to infrared radiation. Wheel 34 has one or more windows 35 which are infrared transmissive. Adjacent to the windows are heater/cooler sectors 37. Sectors 37 include one or more surface temperature sensors (not shown) as described earlier.

Before temperature measurement, wheel 34 is rotated to a position where a heating/cooling sector 37 is aligned with infrared sensor 9, thereby occluding optical axis 36 while sensor 9 exchanges thermal radiation with sector 37. In order to measure the object target temperature, wheel 34 is rotated to a position in which one of the windows 35 is aligned with sensor 9, thus clearing a direct view for the object along optical axis 36. Depending on the application, the wheel may be rotated by steps to alternatively align windows 35 and sectors 37 with sensor 9, or it may be rotated continuously to alternate exposures of the sensor to the windows and sectors.

Although the invention has been described in terms of specific preferred embodiments, and with respect to certain applications, it will be obvious to one skilled in the art that various modifications, substitutions, and applications are contemplated by the invention disclosed herein and that all such modifications, substitutions and applications are included within the scope of the invention as defined in the appended claims.

What is claimed is:

1. An apparatus for measuring the temperature of an object by thermal radiation, said apparatus comprising:
    a thermal radiation sensor for receiving radiation from said object;
    shutter means adapted for reversible interruption of said radiation from said object to said sensor,
    electrically operated means forming an integral part of a portion of said shutter means for maintaining said portion of said shutter means at a predetermined temperature for comprising a thermal reference portion for said sensor,
    means for alternatively exposing said thermal radiation sensor to radiation from said object and to radiation from said thermal reference portion of said shutter means,
    said thermal radiation sensor also being for providing a first signal representative of the radiation it receives from said object, and a second signal representative of the radiation it receives from said portion,
    electronic circuit means connected to said sensor for receiving said first signal and said second signal, for calculating the temperature of said object, and for providing a signal representative of said calculated temperature.

2. The apparatus for measuring the temperature of an object by thermal radiation as described in claim 1, further comprising:
    said electrically operated means integral with said portion for maintaining said portion of said shutter means at a predetermined temperature comprising;
    electrically operated means for changing the temperature of said portion of said shutter means, and
    means for measuring the temperature of said portion of said shutter means and for providing a third signal representative of the temperature of said portion of said shutter means, attached to said shutter means, and
    control means, connected to said means for measuring, for receiving said third signal, and for electrically operating said means for changing.

3. The apparatus for measuring the temperature of an object by thermal radiation as described in claim 2, further comprising: said means for changing the temperature, and said means for measuring the temperature of said portion, being mounted on said shutter means in superimposed layers.

4. The apparatus for measuring the temperature of an object by thermal radiation as described in claim 2, further comprising:
    said shutter means comprising a thermally conductive wall comprising said means for changing the temperature, and said means for measuring the temperature of said portion.

5. The apparatus for measuring the temperature of an object by thermal radiation as described in claim 1, further comprising:
    said means for maintaining said portion of said shutter means at a predetermined temperature comprising a self-temperature regulating element integral with said shutter.

6. The apparatus for measuring the temperature of an object by thermal radiation as described in calim 1, further comprising:
    said shutter means comprising two thermal reference portions and further, two portions of said shutter means comprising optical pathways for radiation from said object to said sensor.

7. The apparatus for measuring the temperature of an object by thermal radiation as described in claim 6, further comprising: said shutter means comprising rotary means for alternatively exposing said sensor to a thermal reference portion and an optical pathway.

8. The apparatus for measuring the temperature of an object by thermal radiation as described in claim 1, further cmprising:
    said shutter means comprising two thermal reference portions.

9. The apparatus for measuring the temperature of an object by thermal radiation as described in claim 1, further comprising:

said shutter means comprising two optical pathways.

10. A method for measuring the temperature of an object by thermal radiation, said method comprising:

bringing a thermal reference portion of a shutter to a predetermined temperature by electrically operating means for changing temperature which is integral with said shutter, then alternatively exposing a thermal radiation sensor to the thermal reference portion, while said shutter is positioned for interrupting radiation from said object to said sensor, and moving said shutter for providing an optical pathway for exposing said sensor to radiation from said object to said sensor, and processing signals from said sensor caused by the exposure of said sensor to said shutter and to said object, for determining the temperature of the object.

11. The method for measuring the temperature of an object by thermal radiation as described in claim 10, said method further comprising:

moving said shutter in an arc for alternating said exposures.

12. The method for measuring the temperature of an object by thermal radiation as described in claim 10, said method further comprising:

said processing of said signal including the equation $$T_b = \sqrt[4]{T_a^4 + nV}$$

where:

$T_b$ is the temperature of the object,
$T_a$ is the predetermined reference temperature of the thermal reference portion of the shutter,
n is a constant, and
V is an output signal of the sensor.

* * * * *

UNITED STATES PATENT AND TRADEMARK OFFICE
CERTIFICATE OF CORRECTION

PATENT NO. : 5,127,742
DATED : Jul. 7, 1992
INVENTOR(S) : Jacob Fraden

It is certified that error appears in the above-identified patent and that said Letters Patent is hereby corrected as shown below:

Column 4, lines 9 through 10:

--Fig. 2 sections 2A, 2B, and 2C, is a timing diagram of temperatures and comparative signals in thermometers constructed according to the invention--.

Column 4, line 62:

Change "Temeprature" to --Temperature--.

In Claim 6:

column 8, line 54, change "calim" to --claim--.

Signed and Sealed this

Twenty-first Day of December, 1993

Attest:

BRUCE LEHMAN

*Attesting Officer*   *Commissioner of Patents and Trademarks*